US005493185A

United States Patent [19]

Mohr et al.

[11] Patent Number: 5,493,185

[45] Date of Patent: Feb. 20, 1996

[54] METHOD FOR ANIMATING MOTOR-DRIVEN PUPPETS AND THE LIKE AND APPARATUS IMPLEMENTING THE METHOD

[76] Inventors: Martin Mohr; Ilona Mohr, both of Auerbacherstr. 16, D-8500 Nürnberg 30, Germany

[21] Appl. No.: 946,431

[22] PCT Filed: Mar. 15, 1991

[86] PCT No.: PCT/DE91/00231

§ 371 Date: Jul. 20, 1993

§ 102(e) Date: Jul. 20, 1993

[87] PCT Pub. No.: WO91/13664

PCT Pub. Date: Sep. 19, 1991

[30] Foreign Application Priority Data

Mar. 15, 1990 [EP] European Pat. Off. .............. 90104909

[51] Int. Cl.$^6$ .................................................... H02K 7/14

[52] U.S. Cl. .................................. 318/3; 318/8; 318/632; 446/330

[58] Field of Search .................................. 318/3, 8, 560, 318/567, 568.1, 568.11, 569, 600, 625, 632; 369/63–64, 68, 69–70; 446/295, 330, 354, 359–367

[56] References Cited

U.S. PATENT DOCUMENTS

| | | | |
|---|---|---|---|
| 4,177,589 | 12/1979 | Villa | 40/457 |
| 4,665,640 | 5/1987 | Forsse et al. | 40/457 |
| 4,825,136 | 4/1989 | Farhat | 318/568.1 |
| 4,949,327 | 8/1990 | Forsse et al. | 369/58 |
| 5,046,022 | 9/1991 | Conway et al. | 901/50 X |
| 5,052,680 | 10/1991 | Malewicki et al. | 272/1 R |
| 5,105,367 | 4/1992 | Tsuchihashi et al. | 901/8 X |
| 5,289,273 | 2/1994 | Lang | 318/16 X |

FOREIGN PATENT DOCUMENTS

| | | |
|---|---|---|
| 3305816 | 8/1984 | Germany . |
| WO84/04670 | 12/1984 | WIPO . |

*Primary Examiner*—David S. Martin
*Attorney, Agent, or Firm*—Bacon & Thomas

[57] ABSTRACT

A method and apparatus for animating motor-driven puppets includes drive units for individual parts or segments of the puppets, a manual input control system for controlling the drive units and generating control signals, and a computer having a memory in which the control signals can be stored for controlling the drive units. Further sub-control signals are superimposed on the control signals for modifying them in order to refine the movements and expressions of the puppet and to generate automatically controlled sequences of movements which form expressions and lifelike behaviors. Certain behaviors and expressions can be pre-stored for superpositioning on the movements of the puppet during a performance.

15 Claims, 2 Drawing Sheets

METHOD FOR ANIMATING MOTOR-DRIVEN PUPPETS AND THE LIKE AND APPARATUS IMPLEMENTING THE METHOD

BACKGROUND OF THE INVENTION

1. Field of the Invention

The invention concerns a method for motor-animating puppets and the like and apparatus with which to carry out the method.

2. Description of Related Art

The above puppets and the like include mime-puppets, animal puppets, toys and amusement figures, animated plants, puppet or doll objects and the like, all or part of their figure-surfaces as well as limbs being moved in such a way that the jerky puppet motions of the entire or partial figure-surfaces as well as limbs are eliminated, as a result of which the continuous impulse-free motions can be implemented in a way unlike that of puppets and hence closer to the ways of people.

The expression herein of "animation" covers the vital facial expressions which are characteristic of the particular species, and also behavior which is specific to the particular species. By means of mechanical, electromechanical and electronic systems and their effects, the invention thoroughly exploits the imparted, artistic figure facial expression and behavior characteristic of the particular species. The method of the invention is intended to make possible the storage, processing and optimization as well as reproduction of the acoustic, optic, mechanic, electrotechnical and electronic effects in the life-like animation of artificially moved figures such as puppets.

There have been attempts and solutions in puppetry to additionally actuate individual elements such as the eyes or the mouth of a performing puppet in order to endow the puppet with greater expressiveness. Nevertheless, even puppets with a plurality of functions, including the ability to move the mouth, close the eyes or more, still fell short of having a "facial expression".

Illustratively, such a development approach is known from German patent document 23.036,614, which relates to apparatus for forcing lip motion in a toy doll, in particular a doll head with a motor-driven gear for eccentrically driving an actuation lever connected to an elastic strip. Each lip is moved by a bar cooperating with a corresponding cylinder projection mounted eccentrically on the gear. However, the "life-like" lip motion transmitted to the doll is far from actually being life-like.

We also refer to the disclosed European patent application 0,150,690 wherein the motion of the doll eyes is achieved by a particular gear mounted on a vertical shaft inside the head and operationally connected with the eyeballs.

Moreover, European patent application 0,212,871 discloses a method and apparatus for recording and reproducing signals controlling animation. This method and apparatus provide signal-processing by discrete logic and, as a result, signal-processing is possible only in a restricted way.

U.S. Pat. No. 4,825,136 discloses apparatus for controlling a doll based upon storage and reproduction of analog and digital recorded signals. Again, this apparatus is unsuited to effectively process the control signals.

Neither the above solution, nor any of the above designs combined with it, render the dolls or puppets life-like or permits such facial expression, on stage or in films, as is required by and acceptable to contemporary audiences.

Current media, namely movies, video, TV, achieve a new quality of observation. The onlooker not only watches the puppet from the best-possible viewer position, but also sees the entire figure, directly in front of him, with even its face enlarged to screen size.

Even though the "classical puppet" with its "classical features", i.e., frozen facial mien, shape as well as possible behaviors, may be displayed in these media by techniques already in use, some of them for centuries, the current media nevertheless make is possible to exploit "closeups" with additional artistic expression and dimensions by means of newly won and controlled facial expression techniques.

The following elements are part of a system, primarily for hand puppets, and created for figures having sizes matching those of conventional glove puppetry, in which, illustratively, one puppeteer controls the puppet with one hand and to which the present invention may be applied:

1. The Envelope

The puppets are fitted with an elastic envelope hugging their shapes. The material of the envelope may be foam, plastic, rubbery material, fabrics, even leather. Preferably, the envelope is made of foam having a variable thickness and cast or pressed into the corresponding shapes and reproducing such features as folds, beads and the like.

This skin corresponds to the external body envelope of living things. It comprises all visible, bared body parts of the figure.

The skin moreover bears the essential molded elements of the external shape formed appropriately in a mold. Being flexible, the skin is directly braced in flexible or rigid contact by an internal frame also precisely matching the shape at all points where this outer skin requires no deforming, or only very little. Those are the points of the natural figure where the outermost body envelope, i.e., the derma, hardly evinces changes or motion, and in humans this is for instance all of the hairy head, the cheekbone area, the nose bridge, the lower jaw etc. The "internal" frame determines the approximate size. the above mentioned skin, which also evinces the finer features of the shape, is slipped over this frame.

As regards the various effects when deforming this envelope, i.e., the ulterior facial expression, the skin may vary in thickness and/or in materials on the inside. Illustratively, cotton wool or very fine foam may be placed underneath the cheeks.

As a result different or desired differential mechanical properties are imparted to the envelope or skin.

2. The Internal Structure

One purpose of the internal structures is, as noted above, to shape and provide support for the external envelope.

In order to endow this external envelope with corresponding extensions, deformations and motions, in part or in whole, to achieve corresponding facial expressions such as a wrinkled brow, a closed eyelid, an opening mouth etc., and to do so precisely and always in identically reproducible manner, those internally generated forces must act as in a natural body, namely (a) as regards their absolute force, (b) as regards their directions, and (c) at their points or areas of application, there must be rigid, flexible or sliding connections, etc., which are previously determined, implemented and controlled in relation to the intended effects.

In a puppet representing a human, for example, the entire lower jaw may be formed by a rigid bail in the shape of the human lower jaw and which can be pivoted about the jaw articulation axis and thus allows opening and closing of the mouth.

Rigid connection between the bail and the envelope is not required because this envelope hugs the bail which carries it along as it moves, and because the minimal relative displacements between bail a. nd envelope which are to be controlled by the shapes of the bail and envelope also eliminate the "stiffness" and therefore the natural process is imitated very effectively.

As another example, the mouth-corner in the envelope must be rigidly linked in point form to an inner structure to control mouth effects in all nuances. Regardless of whether the mouth is open or closed, the corner must point up for a jolly effect and down for a sad one.

Preferably, these internal structures are implemented using plunger, bail, and lever mechanisms, etc., causing corresponding pressures, tractions or other mechanical effects at defined contacts with the envelope and thus producing the facial expression by means of the envelope. The mechanisms must accurately match the desired effect by their force, amplitude and direction, etc.

The most suitable solutions, for instance for the above lower jaw, are logic systems at pre-formed anatomical structures of the original features.

The anchoring or fixing points of these structures are inside the figure along a central axis, or at other accessories.

3. Force Transmission

Because of the volumes involved—the head of a conventional hand puppet is about 15 to 20 $cm^3$, a size which moreover must accommodate the puppeteer's finger tip, and which is applicable to the eyes, eyebrows, etc. or larger figures—as a rule, motors or the like cannot be positioned to deliver the power to actuate levers or other devices.

The inside parts, small levers, etc., are connected by bowden cables with the parts providing the force and located outside the figure, in other words they are connected to the traction-cores of bowden cables or are fitted into hydraulic mechanisms.

4. Application of Force

The bowden traction sheath and core are coupled each to a motor or servo-motor outside the figure, i.e., the puppet, the motor or servomotor being matched as regards power and motion to the coupled internal structure to generate corresponding displacements.

5. Power Control

When the motors or servomotors are connected to corresponding control means, the displacements of the control result in envelope displacements analogous to the initiated ones.

The envelope displacements amount each time to a linear displacement element or, in connection with several elements, to an expression— within the possible displacement or expression of the overall figure.

The above described method already is the object of a German patent application P 39 01 079.1-42 for the special case of a manually operated puppet.

Below another method is disclosed whereby all acoustic, mechanical and optical effects can be enhanced by modern technology, resorting to audio-visual carriers to achieve artistic optima in particular as regards facial expression and differentiated figure animation.

Differential displacement, in particular differential facial expression, presumes a large number of single controls, individual displacements including the closing of eyes, up-and-down, left-and-right motion of eyes, opening the mouth, etc., and further integrating these individual motions into the "total motion of the total effect of the total expression", to mention only a few considerations.

The large number of single, simultaneous controls as well as their complexity may overtax the puppeteer, regardless of the obligatory, high-quality special training required and the presumed transfer as "puppeteer", the more so because the technique of animation and the controls may vary from puppet to puppet and because several figures or several techniques may be required for even one scene or one setting.

SUMMARY OF THE INVENTION

The object of the invention is to make possible reproducible figure displacement and motion which are improved to the point of being approximately life-like. This problem is solved by the features of a method in which both direct and indirect control means represented by superposed sub- and main control signals, respectively are associated with the artificially moved figures, the indirect control means being connected by a computer including an analog-digital converter and a decoder, a memory, and a magnetic tape containing at least two tracks and bearing a sound and timing codes, with insertion of a regulator, the puppet motion further being controlled by the above components in reproducible manner using sound-and-light effects.

The apparatus of he invention further may be characterized in that the simultaneous motion of several objects, i.e., puppets together with sound-and-light effects, is possible.

Most of all, the technical progress provided by the invention lies in the reproducible and optimal simulation of natural motion and facial expression by means of artificial and natural controls. None of the known literature allows this functional success.

A computer-supported method is described below, which optimizes the animation of a manually actuated puppet.

Sound is reproduced following presentation of a script in the studio. The talk, for instance dialog, is produced as for a radio play with due account for the subsequent puppetry. Then the action sounds, such as thunder, closing doors, etc.c are admixed to permit corresponding reactions by the puppeteer.

If possible, music may be incorporated to further "animate" the puppeteer in his actions.

The final-mixed sound played off a sound medium forms the play script to guide the puppeteer in the immediate animation of the puppet.

On one hand, the facial-expression puppets are guided "directly", in other words, the puppeteer bears the hand puppet on his hand and imparts to its body-shape, structure and motion.

For differential facial expression and behavior, the puppeteer needs accessories, i.e., "indirect animation", in other words, the motion will be not be implemented through an analogous displacement of fingers or hand, but by means of accessories.

The most minute displacements are made possible using servomotors which are part of a suitable mechanical system, by transmitting the power through bowden cables and the action of same on a suitably shaped envelope, one servo-mechanism being used for one-dimensional or linear motion. These linear motions can be controlled whether or not they are imparted by servo-mechanisms.

A plurality of different displacements requires a corresponding number of such linear displacements or channels with associated control and control means.

As voice may be stored on a magnetic tape, the controls activated by the puppeteer are stored qualitatively and quantitatively.

Because the puppeteer actuates the individual regulators in "analog manner", for instance using a slide control, the storage requires analog-digital conversion.

When replaying the stored controls with digital-analog back-conversion and when feeding them back into the original channels, the computer will reproduce the original control in the channels and hence the original animation.

The block-circuit diagram used to implement the method of the invention is elucidated in the attached drawings.

BRIEF DESCRIPTION OF THE DRAWINGS

Other features of the invention are discussed in the description below in relation to the attached drawings. Both the description and the drawings are provided in illustrative and non-restrictive manner.

DETAILED DESCRIPTION OF THE PREFERRED EMBODIMENT

Figure 1:
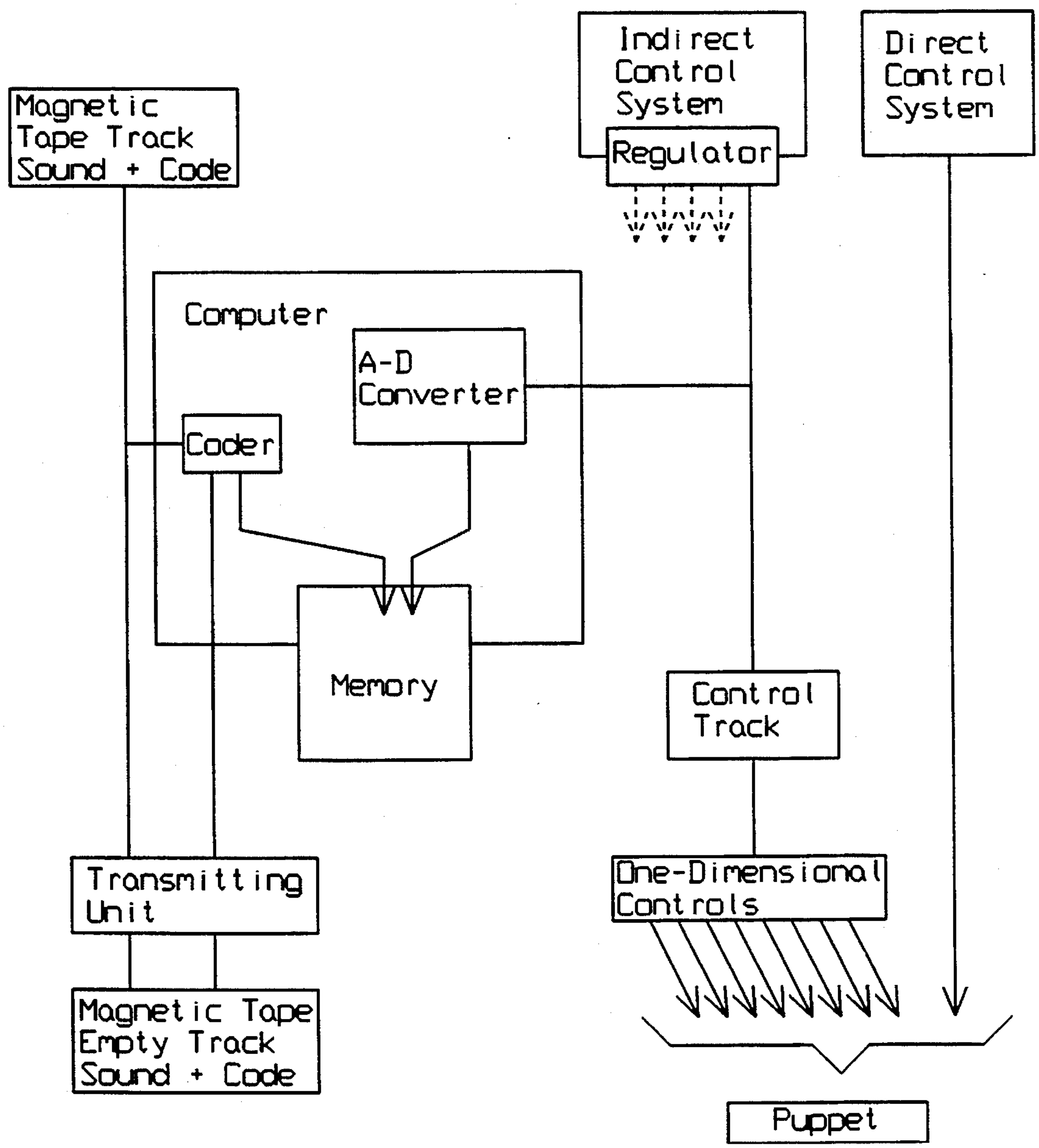
FIG. 1 is a block diagram of a preferred displacement and sound/light effect recording arrangement for the animation system of the invention.

FIG. 1 shows a recording position in which a magnetic tape 1 is connected to a coder 2/a in the computer 2. In the simplest case, this will be a two-track magnetic tape which, on one track, carries all the sounds of a voice, noise and music together. In the initial recording, the connected computer 2, i.e., the coder 2/a, feeds a continuous code characterizing each marking site of the previously empty track. The computer further more also stored this coding in its memory 2*c*.

A signal from an indirect analog control system 3 is generated in a regulator 5, digitized in the analog-digital converter 2*b*, and also arrives in the memory 2*c* in synchronization with the sound track, where it is coupled to the identical code, i.e., the continual code signals already recorded on the second sound track. On account of this code, the computer contains unambiguous and immutably separate association of each characterized site of the play program, that is of the sound, and of the regulation implemented at this time.

The direct motion of the puppet 7 is implemented by direct control means 4, for instance the hand. The reference 6 denotes the control track, and 10 denotes the sum of all one-dimensional controls which together with the direct control means 4 act on the puppet-system 7 and as a whole implement the "play".

Figure 2:
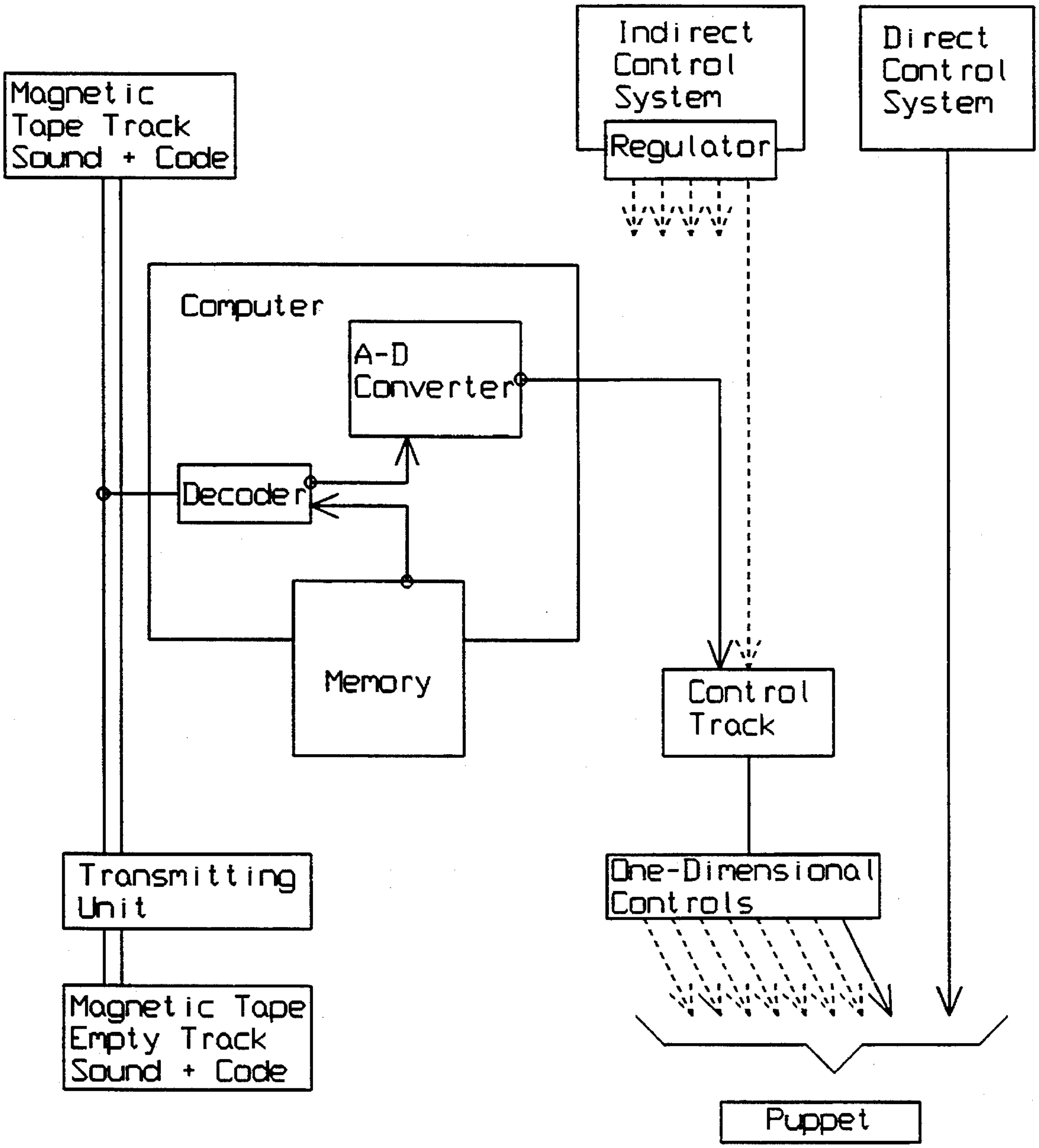
FIG. 2 is a block diagram of a preferred displacement and sound/light effect playback arrangement for the animation system of the invention.

In the case of reproduction as shown in FIG. 2, operation differs from the above generation in that the coder 2*a* is now a decoder, and the analog-digital converter 2*b* is now a digital-analog converter. In replay, the magnetic tape feeds the code signals, which are absolutely synchronous with the sound, to the decoder.

This code enables the computer to activate the digitized control-and-regulation data from the memory 2*c* which are provided with the same code. Following digital-analog conversion, these signals are again fed to the control track 6.

The "sound play" is the script for the mechanical play, i.e., the total sequence of manipulations, and secondarily also for its storage.

Obviously motions also may be stored without parallel "hear play" in the manner of a pantomime. Appropriately, in that case, the player receives parallel instructions in the form of acoustic data, signals, sequence information, programming or other information in synchronization with the control signals to be stored.

These instructions and signals also may be admixed to "normal" hear-plays so that assistance will be provided to the individual player as well as to the overall theme.

Not only does the core correspond to constant timing, but it also contains the characterization of arbitrary sites in the play original, i.e., in the sound play. Perforce the code is more complex than a pure timing signal would be. Nevertheless processing is facilitated by the particular time-linear and identical sequence of a scene, and hence the storage sequence on the magnetic tape and/or in the memory associated with the computer 2.

On the other hand, any arbitrary site of a scene can be searched and found for purposes of sampling, adjusting, recording, correcting, etc., and can be reproduced in technically identical manner. The sound provides direct acoustic identification of a scene to the puppeteer. The code allows the computer to associated and monitor the corresponding stored digital signals.

Processing and Optimization

In replay and following digital-analog conversion of the stored signals, the computer assumes the control in the previously stored channels.

Control by the puppeteer in the corresponding control tracks may be suppressed entirely. In that case, the puppeteer no longer needs to control the channel being replayed.

However the analog control also may be preserved in the "dominant" mode. In other words, actuation of control or of one regulator by the puppeteer will provide such control; in the event of lack of activation, control is carried out by the digital-analog converted pulses.

The analog control may be preserved in "quantitatively-modifying" manner by the puppeteer. In other words, the puppeteer may increase or decrease the predetermined or stored regulations, i.e., regulates only by plus and minus adjusting regulations already extant.

In preserving the control in "quantitatively modifying" manner, the puppeteer is able to continuously actuate the corresponding control or he may do so in response to a specific situation. The computer integrates the stored and present regulations and pulses for effective control.

The method of the invention allows incorporating any number of all channels simultaneously and incorporating individual or an arbitrary number of channels consecutively.

CORRECTIONS

The method of the invention allows post-facto correction of individual channels, that is, when recordings already exist and/or the total recording is "standing", as follows:

1. Correction of the total stored controls of a channel of a scene, may be accomplished by completely re-recording this channel while the residual program of the overall system remains unchanged.

2. For correction of individual sequences within the stored control of a channel, the computer assumes matching the data, in other words and foremost the hookup sites.
3. "Quantitative" correction of the entire store control or of individual sequences within the stored control of a channel, i.e., raising or lowering the magnitude of the digitally stored control pulses of one or of arbitrary channels by a definite percentage to be monitored, corresponds to increasing the reduction in speed and intensity or force along the regulated reference path, for instance in the regulated puppet-mouth aperture, to more rapid, slower and wider or narrower mouth aperture control.

3a. "Dry-run" correction without puppet participation, in the absence of play by system input or programming, is also provided for stored control of one or more channels, in whole or in part or arbitrary sequences by a percentage to be determined.

3b. For analog "life" correction during the replay, the puppeteer or the director can quantitatively modify the magnitude of the control signals of one or of an arbitrary number of channels.

FURTHER WAYS TO OPTIMIZE

A. PROGRAMMING TRANSITORY STATES

Various concrete static regulation conditions or elements of static expressive recordings, and consisting of one or more single regulation channels with concrete states in the various single regulators jointly building up the expression, are programmed as transitory or target states in the sequence of the play.

In other words, a specific regulation in one or in simultaneously different positions in the corresponding different regulators and corresponding to a static state, a kind of "snapshot" in the puppet system, for instance the expression of fear can be set, searched for an/or selected regulator by regulator.

The computer can insert this state following takeover at an arbitrary passage of the play within the computer-controlled play. The computer also assumes the adaptation of this "static individual adjustment" into the play to become a continuous sequence of play which at the desired target point evinces precisely the previously defined system state. The duration, that is the time this adjustment is being retained, and also for instance the adaptation intervals of data flow present at this target point as well as going back to the previously extant data flow, can be made to be variable and situation-specific. This method can be implemented using one or an arbitrary number of channels, that is, displacement elements, either once or with arbitrary frequency during the play.

B. PROGRAMMING DYNAMIC SEQUENCES

The computer takes over the continuous controls within a time interval which always is precisely defined but in principle may be of arbitrary length, in one or in an arbitrary number of channels previously determined and which, for instance, participate in an effect or a dynamic expression. These defined sequences of motion or regulation procedures can be inserted as in A into the extant data flow or play sequence and adapted correspondingly.

Examples include spontaneously closing eyelids, randomly but naturally in a manner superposed on the eyelid motions otherwise controlled as a function of actions, or, continuous and occasionally briefly interrupted motion of the nose tip in a dog etc. and also motorized tics or characteristics of a figure.

These sequences of motion also may be processed, for instance they may be time-expanded or time-compressed, and they may be restricted in regulation amplitude, or lowered or increased etc.

C. SIMPLE LINKAGE OF DISPLACEMENT ELEMENTS

Examples include slightly drooping eyelids when looking down, or a slight mouth opening with maximum head rotation etc.

In other words, when maximally activating a specific channel, frequency another channel or several may also be activated thereby or suppressed in a qualitative and quantitative manner as precisely determined during the time interval specified, and coupled.

These linkages range from connected individual channels to displacement patterns, in other words, the linkage of an entire family of channels.

An example includes at maximum mouth aperture, simultaneously providing a maximum opening of eyelids while the eyeballs stare straight ahead.

As shown, the linkage also may be the lowering of activity in another channel. It need not always be a parallel increase in activity.

D. PROGRAMMING MORE COMPLEX, ALREADY QUALITATIVELY AND QUANTITATIVELY EXPRESSION-AND-MOOD ELEMENTS CALLED "BACKGROUNDS"

An example of this is sadness-depression: small gaps between the eyelids, a slight lowering of the upper eyelids, a slightly drooping corner of the mouth as the initial state of representing a mouth, limiting the activation of all channels, for instance the mouth opening only to 50% of maximum, etc.

The puppeteer guides and plays the puppet directly and alone by indirect control. A sad mood which from the beginning affects, slows and stops the living can be performed here similarly or be integrated as a superposition for direct control.

On one hand, the puppeteer guiding the puppet, as a rule one person, for instance the director, or further puppeteers on the other hand, may enter such a. program in a manner similar to a one-dimensional control from minimum to maximum:

D.a During the very first play

Storage: controls in the play itself+programmed control

D.b During replay, adding programmed control

Storage: D.b.a replayed control+programmed control

D.b.b only original control

D.c Programming for replay in addition to stored contents

D.c.a replay implements stored contents+ programming renewed storage: originally stored control+ programmed control D.c.b replay as in D.c.b renewed storage: unchanged original control D.c.c replay as in D.c.a renewed storage: both versions.

Accordingly, this method allows further "dyeing-in" preset or already worked-out control, behavior and expression procedures of the figures, for instance to superpose on them moods, or to reinforce and match moods.

E. COMPUTER-CONTROLLED INTEGRATION OF VARIOUS SINGLE CONTROLS

E.a Integration of various stored and/or stored and played regulations in identical channels as described above into one effective regulation.

a.a complete series of data a.b one or more complete sequences of data with selected single sequences of identical channels for defined positions, E.b Integration of various channels from different series of data into a new series of data Example Linking channels for mouth motion from data-sequence x with the data channels for eye motion from the data-sequence y into a complete data-sequence z.

F. PROCESSING THE CONTROLS WITH COMPUTER GRAPHICS

All the controls, that is the regulations stored in the various channels, can be represented graphically whether singly for each channel or for several channels jointly with the regulation state as the amplitude, the amplitude being a function of time and again also characterized by the code.

These graphics can be processed using current or adapted computer programs and programming.

In an especially preferred embodiment involving modifications in the graphics, it is possible to undertake corrections, insertions, and most importantly adaptations so that the effects can be judged before the fact.

The computer takes over the end graphics in corresponding data values and sequences, that is, again in modified regulation sequences corresponding to processing.

This method with all its possibilities is comparable to processing a musical score as the script, all effects being jointly shown as in the case of a single channel in the overall sequence. The effects can be detected, compared and balanced, changed, retained or entirely be eliminated, and isolated as seen from the perspective of the entire system.

All sorts of possibilities of a "purely improvisational" play are created, that is, the puppet carries out motions at the end of the process which it never showed before in such manner.

G. CONTROL BY PUPPETEER

Opposite thereto is the spontaneous, computer-controlled regulation of the puppet by the puppeteer.

This does not involve control by regulation, and therefore doe not require a computer.

If for instance the puppeteer directly "lends his voice", i.e., "life", to the puppet during the play's actions and in the process recites the puppet dialog into a microphone, the computer which is coupled to the acoustic signals can then assume the corresponding synchronous regulation of the mouth or part of it in frequency-and-amplitude controlled manner.

Further controls are possible in relation to this example, which may be advantageously used in films but most of all in the theater and which are triggered by the direct, situation-specific and situation-conditioned reactions of the puppeteer.

H. EXCLUSIVELY COMPUTER-SUPPORTED METHODS

Self- or computer-controlled correction programs

Examples H.a Correction or elimination by computer of "technical defects" or dropouts in connection with the magnetic tape or the like, and entailed error regulations H.b Balancing or matching to "harder" regulation, that is of phenotypic, impulsive or robotic appearing regulations H.c Exclusion of incompatible regulations or those jeopardizing he system; for instance, as regards a long-eared dog, the left and right ears should touch or be mutually hampering, damaging etc.

I. SELF-CONTROLLING AND SELF-GENERATING METHODS AND PROGRAMS

Upon determining and storing or assuming individual displacement and behavior components and actions, the computer is able to adapt and generate certain sequences.

Example walking, determining the lifting of the thigh, bending the knee, lifting the forefoot and the possible linkages As regards the translational motions, the computer is able to purposefully control the individual elements and to combine them "autonomously As regards the outlook, and similarly to a chess computer, the computer is able to self-generate behavior-and-reaction patterns.

By means of the above method, the system as a whole can be optimized both quantitatively and qualitatively. All variations, both as regards films, special-effect films and stage, are possible from the completely manually guided and present-situation dependent and play controlled behavior and expression to the computer-generated performance of the puppet.

Obviously this system can be optimized as a whole not only for hand-guided puppets in animation but also for dolls in the widest sense. The puppet or doll also can perform without direct puppeteer animation. The system and the method make possible the computer-supported and controlled phenotypic "autonomous puppet and figure".

No limits are set on the differentiation in expression and behavior by the inherent system and method. In other words, an arbitrary number of operations of arbitrary gradations and complexity may be used.

In addition to the motor-actuation of the puppets, i.e., their animation, the overall light also maybe optimized in the manner of staging. As already previously mentioned, the method is not restricted to hand puppets or puppets and dolls in general. It may also be applied to puppetry special-effects films and in any production using special effects that do not come about by themselves, such as for instance by the participant, but instead are controlled "from the outside".

Several economically significant effects are brought about:

(a) There is substantial saving in puppeteers, with assumption of operations and controls by the memory instead of the additional puppeteers that were needed to animate a system or figure by remote control, whether wireless or by cable.

(b) There is substantial stress-relief for the puppeteer due to reduction of the required concentration on all the single systems and their precise synchronization, and relief from simultaneously required "additional tasks" such as the actuation of mouth, eyes, eyebrows, eyelids etc., the additional operations not only being additive with respect to mastery but the total task difficulty increases with each particular one in a manner similar to the increase in juggling difficulty based on the number of balls being simultaneously juggled.

Without degrading the overall artistry, the puppeteer can concentrate totally on the expression of the overall figure as regards pose and aura, in the manner of a "simple" conventional hand puppet, the number of simultaneous operations being perforce limited even for accomplished puppeteers and participants.

When operations are taken over by further participants, there arises at once a need for substantial training in order that the overall actions as initiated by different puppeteers can take place in such manner that they take place as if from "one mold".

(c) The particular "best puppeteer" for a particular effect or motion can play the same consecutively and store it for each puppet.

(d) The synchronization of a play script with, for example, voice and mouth motions or the like, succeeds with optimal precision and in an incomparably short time because, int eh process, the puppeteer 1) is able to concentrate solely on these individual synchronizations whereas the other motions may be stored consecutively later 2) all successful motions and effects can be preserved by being stored for any desired period of time 3) defects or "poorer parts" from entire passages to single actions either can be corrected as a whole without the constraint that the whole must be repeated (e) Extant parts which are perfect in individual aspects may be perfected as a whole, such as a mouth-opening with perfect timing relative to the accompanying voice (f) The matching in time between the play script and the play for individual paul segments, further for the overall sequence "without puppeteer" without a kind of "general test" and graphics-controlled "with the camera" before the work and where required can be adapted again (g) for the first time, the possibility arises that the play be guided and accompanied for instance by the producer or other persons not only in an instructing manner but also directly, being able both to co-direct the play qualitatively as well as quantitatively, (h) The possibility to compare directly carious aspects of the play because of the identical quality of the stored motion aspects is ensured (i) substantially shortened production times because the stored motions and those controlled by the computer take place identically and flawlessly, and the lesser stress on the puppeteer reduces the puppeteer-induced faults and required repetitions.

We claim:

1. An animation method comprising the steps of:

(a) providing a figure to be animated, said figure having at least one drive unit for driving a part or segment of the figure;

(b) providing a control system and manually causing the control system to emit control signals for controlling said at least one drive unit;

(c) digitizing the control signals;

(d) feeding the digitized control signals to a processor and processing them individually or in sets;

(e) storing the processed control signals in a memory;

(f) transmitting the stored control signals to said at least one drive unit after converting said signals to analog form in order to animate the figure;

(g) modifying said control signals by superimposing sub-control signals on them during animation of the figure, wherein life-like and spontaneous movements of the figure can be obtained under direct control of an animator even as the stored control signals control basic animation functions to relieve the animator of the need to control said basic animation functions.

2. A method as claimed in claim 1 wherein step (g) comprises the step of manually generating said sub-control signals during animation of the figure.

3. A method as claimed in claim 1, wherein step (g) comprises the step of reading out the sub-control signals from a previously stored sub-routine.

4. A method as claimed in claim 1,wherein step (g) comprises the step of causing the sub-control signals to change a magnitude of the control signals for a selectable set of drive units.

5. A method as claimed in claim 1, wherein step (g) comprises the step of modifying the control signals to change a length of movement of said driven part or segment.

6. A method as claimed in claim 1, wherein step (d) comprises the step of expanding and compressing, reversing, and phase shifting the control signals associated with individual motion procedures, in order to slow or accelerate motion of the figure.

7. A method as claimed in claim 1, wherein step (d) comprises the step of implementing a selection system by which the modified control signals may be applied to an individual drive unit or to set of drive units.

8. A method as claimed in claim 1, further comprising the step of storing the modified control signals in memory as a sub-routine which can be turned on or off.

9. A method as claimed in claim 1, further comprising the step of expressing the control signals as a series of data which can be represented on a screen for processing.

10. A method as claimed in claim 9, further comprising the step of, in order to implement natural patterns of motion when a predetermined value of a control signal of one of the control channels is exceeded, automatically modifying control signal values.

11. A method as claimed in claim 1, further comprising the step of arranging a totality of said control signals by individual channels which can be expressed as computer graphics or represented on a screen for processing by changing the graphics, and causing said processor to form control sequences based on the changes in the graphics.

12. A method as claimed in claim 1, further comprising the steps of storing basic patterns of motions such as walking, sitting, and jumping, and basic facial expressions such as joy, laughter, sorrow, and weeping, as blocks of sub control-signals and sub-routines, and superimposing the blocks on manually played-back and stored control signals for other patterns of motion.

13. Animation apparatus, comprising:

a figure to be animated and means including at least one drive unit for driving a part or segment of the figure to be animated;

control means for directly transmitting electrical control signals to control said at least one drive unit in response to manual activation;

a processor;

a memory connected to the processor for storing control signals and issuing the control signals to said at least one drive unit for automated activation of the figure; and a digital to analog converter for converting signals output by said processor into digital form and an analog digital converter for converting signals input to said processor into analog form, and further comprising a superposition system for superimposing sub-control signals on said control signals, said sub-control signals being either manually generated via the control means or read-out from sub-routines made up of said control signals stored in said memory in order to modify the manner in which the figure is animated by the control signals which are directly transmitted to said drive unit from said control means.

14. Apparatus as claimed in claim 13, further comprising means for connecting the system to drive units of a plurality of puppets.

15. Apparatus as claimed in claim 13, further comprising means for connecting sound and light equipment to the system for activation by stored sound and light signals.

* * * * *